(12) United States Patent
Kim et al.

(10) Patent No.: US 10,203,969 B2
(45) Date of Patent: Feb. 12, 2019

(54) METHOD FOR PROVIDING ADDITIONAL INFORMATION ABOUT APPLICATION AND ELECTRONIC DEVICE FOR SUPPORTING THE SAME

(71) Applicant: Samsung Electronics Co., Ltd., Gyeonggi-do (KR)

(72) Inventors: Joohyun Kim, Gyeonggi-do (KR); Hyoungjoon Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/608,156

(22) Filed: May 30, 2017

(65) Prior Publication Data

US 2017/0371688 A1 Dec. 28, 2017

(30) Foreign Application Priority Data

Jun. 22, 2016 (KR) ........................ 10-2016-0077803

(51) Int. Cl.
*G06F 9/445* (2018.01)
*G06F 9/44* (2018.01)
*H04L 29/08* (2006.01)
*G06F 8/65* (2018.01)
*G06F 21/57* (2013.01)

(52) U.S. Cl.
CPC ............ *G06F 9/44536* (2013.01); *G06F 8/65* (2013.01); *H04L 67/34* (2013.01); *H04L 67/36* (2013.01); *G06F 21/57* (2013.01)

(58) Field of Classification Search
CPC ... G06F 8/60; G06F 8/61; G06F 8/452; G06F 9/451; G06F 8/65; G06F 8/71; G06F 17/30867; G06F 8/654; G06F 8/658; G06F 8/68; G06F 9/44536; H01L 2924/0002; H01L 2924/00; H04L 67/34; H04L 67/36
See application file for complete search history.

(56) References Cited

U.S. PATENT DOCUMENTS

| | | |
|---|---|---|
| 9,235,402 B2 * | 1/2016 | Carpenter ........... G06F 9/44505 |
| 9,569,468 B2 * | 2/2017 | Mesika ............ G06F 17/30289 |
| 9,652,218 B2 * | 5/2017 | Walle ........................ G06F 8/61 |
| 10,019,558 B2 * | 7/2018 | Biswas ............... G06F 21/6209 |
| 2010/0058233 A1 * | 3/2010 | Chan ....................... G06F 9/451 715/810 |
| 2011/0219301 A1 * | 9/2011 | Tomono ................. G06F 17/00 715/274 |
| 2012/0246623 A1 * | 9/2012 | Creel .................. G06F 11/3672 717/128 |
| 2012/0317561 A1 | 12/2012 | Aslam et al. |
| 2014/0325487 A1 * | 10/2014 | Maczuba ............ G06F 11/0778 717/128 |
| 2017/0351506 A1 * | 12/2017 | Celikyilmaz ............. G06F 8/65 |
| 2018/0189047 A1 * | 7/2018 | Jaladi ....................... G06F 8/71 |

* cited by examiner

*Primary Examiner* — Thuy Dao
(74) *Attorney, Agent, or Firm* — Cha & Reiter, LLC

(57) ABSTRACT

An electronic device and method are disclosed. The electronic device includes a communication unit, a display, a memory and a processor. The processor implements the method, including analyzing activity of an application to identify at least one function of the application added, deleted or altered by an update to the application, and controlling the display to display at least one item selectable to provide additional information corresponding to the identified at least one new function.

12 Claims, 10 Drawing Sheets

METHOD FOR PROVIDING ADDITIONAL INFORMATION ABOUT APPLICATION AND ELECTRONIC DEVICE FOR SUPPORTING THE SAME

CLAIM OF PRIORITY

This application claims priority from and the benefit under 35 U.S.C. § 119(a) of Korean Patent Application No. 10-2016-0077803 filed on Jun. 22, 2016, which is hereby incorporated by reference for all purposes as if fully set forth herein.

TECHNICAL FIELD

Embodiments of the present disclosure relate to a method for providing additional information about an application and to an electronic device for supporting the method.

BACKGROUND

Electronic devices can provide a great variety of applications to users. Normally, in order to review online markets, a user might download and install the latest version of a desired application having the necessary functionality. When a new version of the application is installed, the functionality may thus be added to the application. In these cases, a developer of the application may provide feedback mechanisms so that user comments on the functionality may be collected and then, based on the collected comments, the developer may further improve the functionality for the benefit of the user. In short, it is important to collect user's feedback to improve the functionality of any application.

However, conventional electronic devices do not provide a suitable mechanism for receiving a user feedback on each function of the application. Therefore, the user who wants to write his or her comment on the new function suffers some inconvenience, in that once a suitable communication medium is found, they must still describe the functionality and then write the actual comment. In addition, the application developer often have difficulty in accurately correlating the collected comments to their respective functionality.

SUMMARY

Various embodiments of the present disclosure propose an electronic device that automatically recognizes a new function of an application.

Additionally, embodiments of the present disclosure propose an electronic device that automatically recognizes a new function of an application and provides information about the new function so that a user can accurately identify the new function.

Additionally, embodiments of the present disclosure propose an electronic device that visually displays an automatically recognized new function and an item selectable to allow entry of commentary feedback on the new function so that the user base and the application developer can communicate with each other easily and accurately.

According to various embodiments of the present disclosure, an electronic device is disclosed including a communication unit, a display, a memory and a processor. The processor analyzes activity of an application to identify at least one new function of the application by an update to the application, and controls the display to display at least one item selectable to provide additional information corresponding to the identified at least one new function.

According to various embodiments of the present disclosure, a method is disclosed including analyzing activity of an application to identify at least one new function of an application by an update to the application, and control the display to display at least one item selectable to provide additional information corresponding to the identified at least one new function.

The electronic device and method according to various embodiments of the present disclosure may display a new function of an application so as to be easily identified by a user. This provides an effect of promoting the use of the new function.

Additionally, the electronic device and method according to various embodiments of the present disclosure may display a new function of an application and an item for providing a user's comment on the new function. This provides an effect of allowing a user to easily write his or her comment on the new function.

Further, the electronic device and method according to various embodiments of the present disclosure provides an effect of easily and accurately exchanging comments between users and a developer by delivering user's comments to the developer.

DETAILED DESCRIPTION

Figure 1:
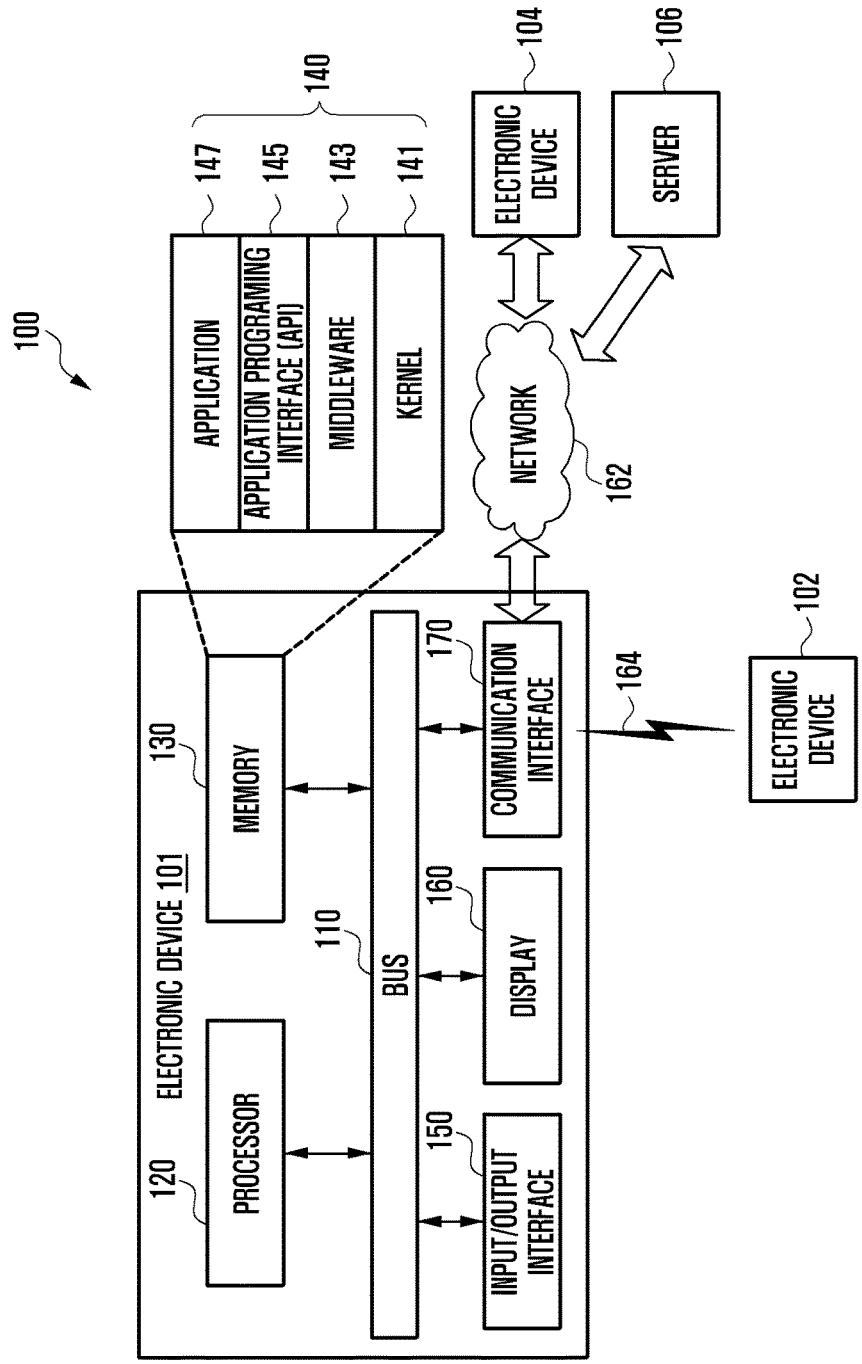
FIG. 1 is a block diagram illustrating a network environment according to various embodiments of the present disclosure.

Hereinafter, the present disclosure is described with reference to the accompanying drawings. Although various example embodiments are illustrated in the drawings and related detailed descriptions are discussed in the disclosure, the present disclosure may have various modifications and several embodiments. However, various embodiments of the present disclosure are not limited to a specific implementation form and it should be understood that the present disclosure includes all changes and/or equivalents and substitutes included in the various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not necessarily be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor or any other processing circuitry) that may execute one or more software programs stored in a memory device to perform corresponding functions.

According to various embodiments, examples of the electronic device may include a smartphone, a tablet Personal Computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a medical device, a camera, and a wearable device, or the like, but is not limited thereto. Examples of the wearable device may include an accessory type device (such as, watch, ring, bracelet, ankle bracelet, necklace, glasses, contact lens, and Head-Mount Device (HMD)), a textile or clothes type device (such as electronic clothes), a body-attached type (such as skin pad and tattoo), and a bio-implemented type, or the like, but is not limited thereto. According to an embodiment, examples of the electronic device may include a television, a Digital Video Disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™, apple TV™, and google TV™), a game console (such as Xbox™ and PlayStation™), an electronic dictionary, an electronic key, a camcorder, and an electronic frame, or the like, but is not limited thereto.

According to an embodiment, examples of the electronic device may include a medical device (such as portable medical sensors (including glucometer, heart rate sensor, tonometer, and body thermometer), Magnetic Resonance Angiography (MRA) device, Magnetic Resonance Imaging (MRI) device, Computed Tomography (CT) device, camcorder, and microwave scanner), a navigation device, a Global navigation Satellite System (GNSS), an Event Data Recorder (EDR), a Flight Data Recorder (FDR), an automotive infotainment device, marine electronic equipment (such as marine navigation system and gyro compass), aviation electronics (avionics), an automotive head unit, an industrial or household robot, an Automatic Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler), or the like, but is not limited thereto.

According to an embodiment, examples of the electronic device may include furniture, a building/structure, a part of a vehicle, an electronic board, an electronic signature receiving device, a projector, and a sensor (such as water, electricity, gas, and electric wave meters), or the like, but is not limited thereto. According to various embodiments, the electronic device may be flexible or a combination of at least two of the aforementioned devices. According to an embodiment, the electronic device is not limited to the aforementioned devices.

In the disclosure, the term "user" may denote a person who uses the electronic device or a device (e.g., artificial intelligent electronic device) which uses the electronic device.

FIG. 1 is a block diagram illustrating a network environment according to various embodiments of the present disclosure.

Referring to FIG. 1, electronic device (e.g., an electronic device 101, a first external device 102 and a second external device 104) and/or server 106 may be connected with network 162 through short-range communication 164.

The electronic device 101, in a network environment 100, includes a bus 110, a processor (e.g., including processing circuitry) 120, a memory 130, an input/output interface (e.g., including input/output circuitry) 150, a display 160, and a communication interface (e.g., including communication circuitry) 170. According to some embodiments, the electronic device 101 may omit at least one of the components or further include another component.

The bus 110 may be a circuit connecting the above described components 110-170 and transmitting communication (e.g., a control message or data) between the above described components.

The processor 120 may include various processing circuitry, such as, for example, and without limitation one or more of a dedicated processor, a central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101. According to some embodiment, the memory 130 may store software and/or program 140. For example, the program 140 may include a kernel 141, middleware 143, an application programming interface (API) 145, and/or an application 147 and so on. At least one portion of the kernel 141, the middleware 143 and the API 145 may be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 143 and includes, for example, at least one interface or function (e.g., command) for a file control, a window control, image processing, or a character control.

The input/output interface 150 may include various input/output circuitry configured to provide an interface to transmit command or data input by a user or another external device to another component(s) of the electronic device 101. Further, the input/output interface 150 may output the command or data received from the another component(s) of the electronic device 101 to the user or the another external device.

The display 160 may include, for example, liquid crystal display (LCD), light emitting diode (LED), organic LED (OLED), or micro electro mechanical system (MEMS) display, or electronic paper display, or the like, but is not limited thereto. The display 160 may display, for example, various contents (text, image, video, icon, or symbol, and so on) to a user. The display 160 may include a touch screen, and receive touch, gesture, approaching, or hovering input using a part of body of the user.

The communication interface 170 may include various communication circuitry configured to set communication of the electronic device 101 and external device (e.g., a first external device 102, a second external device 104, or a server 1106). For example, the communication interface 170 may be connected with the network 162 through wireless communication or wire communication and communicate with the external device (e.g., a second external device 104 or server 106).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

Each of the first external device 102 and the second external device 104 may be same type or different type of device with the electronic device 101. According to some embodiment, the server 106 may include one or more group of servers. According to various embodiment, at least one portion of executions executed by the electronic device may be performed by one or more electronic devices (e.g., external electronic device 102, 104, or server 106). According to some embodiments, when the electronic device 101 should perform a function or service automatically, the electronic device 101 may request performing of at least one function to another device (e.g., external electronic device 102, 104, or server 106). The another device (e.g., external electronic device 102, 104, or server 106) may perform the requested function or additional function, and may transfer a result of the performance to the electronic device 101. The electronic device 101 may additionally process the received result to provide the requested function or service. For the above, cloud computing technology, distributed computing technology, or client-server computing technology may be used, for example.

Figure 2:
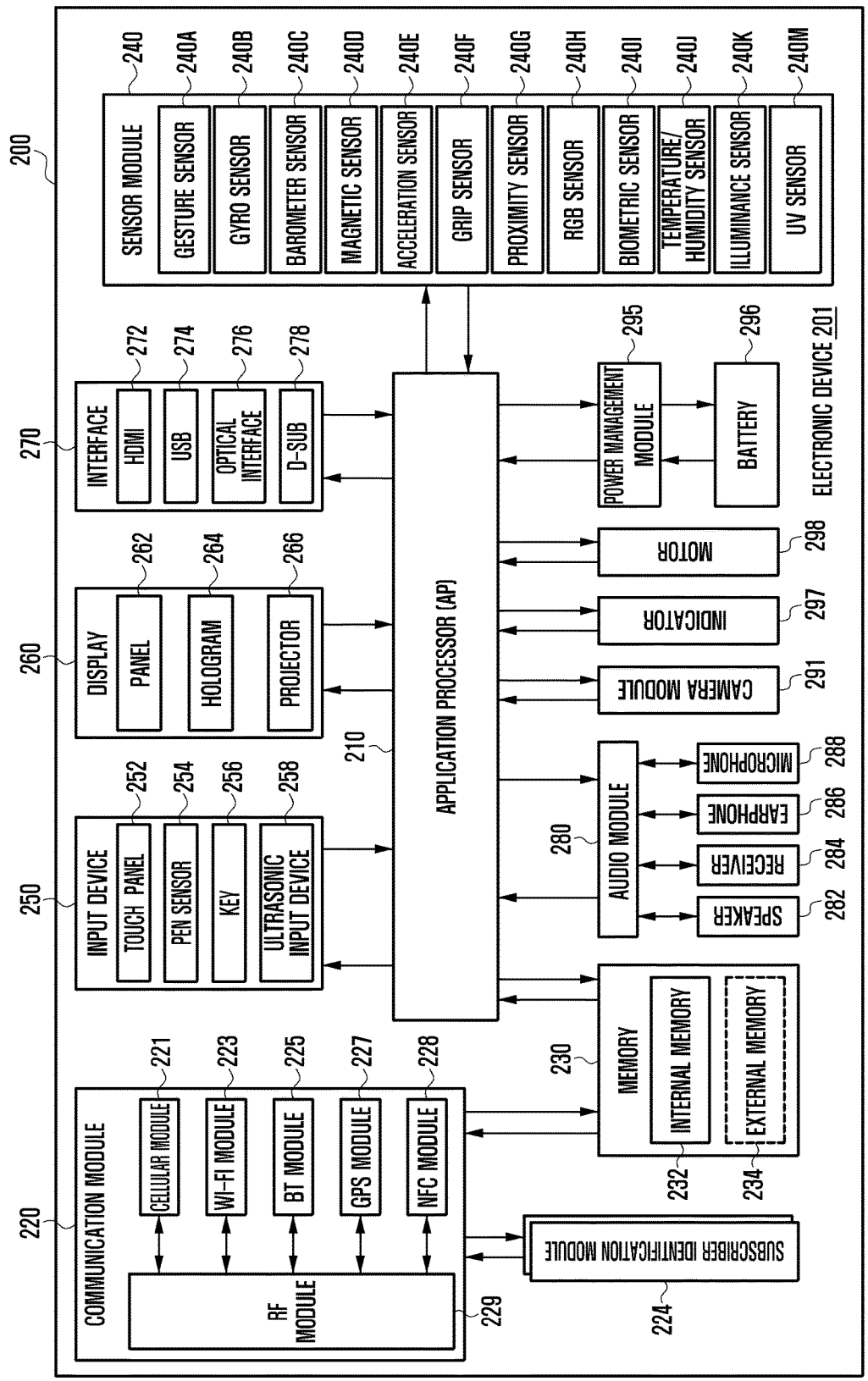
FIG. 2 is a block diagram illustrating an electronic device according to various embodiments of the present disclosure.

FIG. 2 is a block diagram illustrating an electronic device according to various embodiments of the present disclosure.

Referring to FIG. 2, an electronic device 201 may include, for example, a whole or a part of the electronic device 101 illustrated in FIG. 1. The electronic device 201 includes one or more APs (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power managing module 295, a battery 296, an indicator 297, and a motor 298.

The AP 210 may include various processing circuitry and operates an OS or an application program so as to control a plurality of hardware or software component elements connected to the AP 210 and execute various data processing and calculations including multimedia data. The AP 210 may be implemented by, for example, a system on chip (SoC). According to an embodiment, the application processor 210 may further include a graphics processing unit (GPU) and/or image signal processor. The AP 210 may include at least one portion of components illustrated in FIG. 2 (e.g., a cellular module 221). The AP 210 may load command or data received from at least one of another component (e.g., non-volatile memory), store various data in the non-volatile memory.

The communication module 220 may include the same or similar components with the communication interface 170 of FIG. 1. The communication module 220 may include various communication circuitry therein, such as, for example, and without limitation, a cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM card 224). According to an embodiment, the cellular module 221 performs at least some of the functions which may be provided by the AP 210. For example, the cellular module 221 may perform at least some of the multimedia control functions. According to an embodiment, the cellular module 221 may include a CP.

Each of the Wi-Fi module 223, the BT module 225, the GPS module 227, and the NFC module 228 may include, for example, a processor for processing data transmitted/received through the corresponding module.

According to various embodiments, at least part of the cellular module 221, the Wi-Fi module 223, the BT module 225, the GPS module 227, and the NFC module 228 may be included in one integrated chip (IC) or one IC package.

The RF module 229 transmits/receives data, for example, an RF signal. Although not illustrated, the RF module 229 may include, for example, a transceiver, a power amp module (PAM), a frequency filter, a low noise amplifier (LNA), antenna and the like.

According to various embodiments, at least one of the cellular module 221, the Wi-Fi module 223, the BT module 225, the GPS module 227, and the NFC module 228 may transmit/receive an RF signal through a separate RF.

The SIM card 224 may refer, for example, to a card including a SIM and may be inserted into a slot formed in a particular portion of the electronic device. The SIM card 224 includes unique identification information (e.g., integrated circuit card identifier (ICCID)) or subscriber information (e.g., international mobile subscriber identity (IMSI)).

The memory 230 (e.g., memory 130) may include an internal memory 232 and/or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, etc.), a hard drive, a solid state drive (SSD), etc.

According to an embodiment, the external memory 234 may further include a flash drive, for example, a compact flash (CF), a secure digital (SD), a micro-SD, a mini-SD, an extreme digital (xD), or a memory stick. The external memory 1234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., red, green, and blue (RGB) sensor), a biometric sensor 240I, a temperature/humidity sensor 240J, an illuminance (e.g., light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240. In embodiments, the electronic device 201 is capable of including a processor, configured as part of the application processor 210 or a separate component, for controlling the sensor module 240. In this case, while the application processor 210 is operating in sleep mode, the processor is capable of controlling the sensor module 240.

The input device 250 may include various input circuitry, such as, for example, and without limitation, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone (e.g., a microphone 288) through an input means generating an ultrasonic signal to identify data and may perform wireless recognition.

The display 260 (e.g., display 160) includes a panel 262, a hologram unit or device 264, and a projector 266. The panel 262 may be implemented to be, for example, flexible, transparent, or wearable. The panel 262 may also be incorporated into one module together with the touch panel 252. The According to one embodiment, the panel 262 may include a pressure sensor (or force sensor) capable of measuring the intensity of the pressure on the user's touch. The pressure sensor may be integrated with the touch panel 252, or may be implemented by one or more sensors separate from the touch panel 252. The hologram device 264 shows a stereoscopic image in the air by using interference of light. The projector 266 projects light on a screen to display an image. For example, the screen may be located inside or outside the electronic device 201.

The interface 270 may include various interface circuitry, such as, for example, and without limitation, a HDMI 272, an USB 274, an optical interface 276, and a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 and the like.

The camera module 291 is a device which may photograph a still image and a video. According to an embodiment, the camera module 291 may include one or more image sensors (e.g., a front sensor or a back sensor), an image signal processor (ISP) or a flash (e.g., an LED or xenon lamp).

The power managing module 295 manages power of the electronic device 201. Although not illustrated, the power managing module 295 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. Although not illustrated, the electronic device 201 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments may be implemented by one or more components and the name of the corresponding component may vary depending on a type of the electronic device. The electronic device according to various embodiments may include at least one of the above described components, a few of the components may be omitted, or additional components may be further included. Also, some of the components of the electronic device according to various embodiments may be combined to form a single entity, and thus may equivalently execute functions of the corresponding components before being combined.

Figure 3:
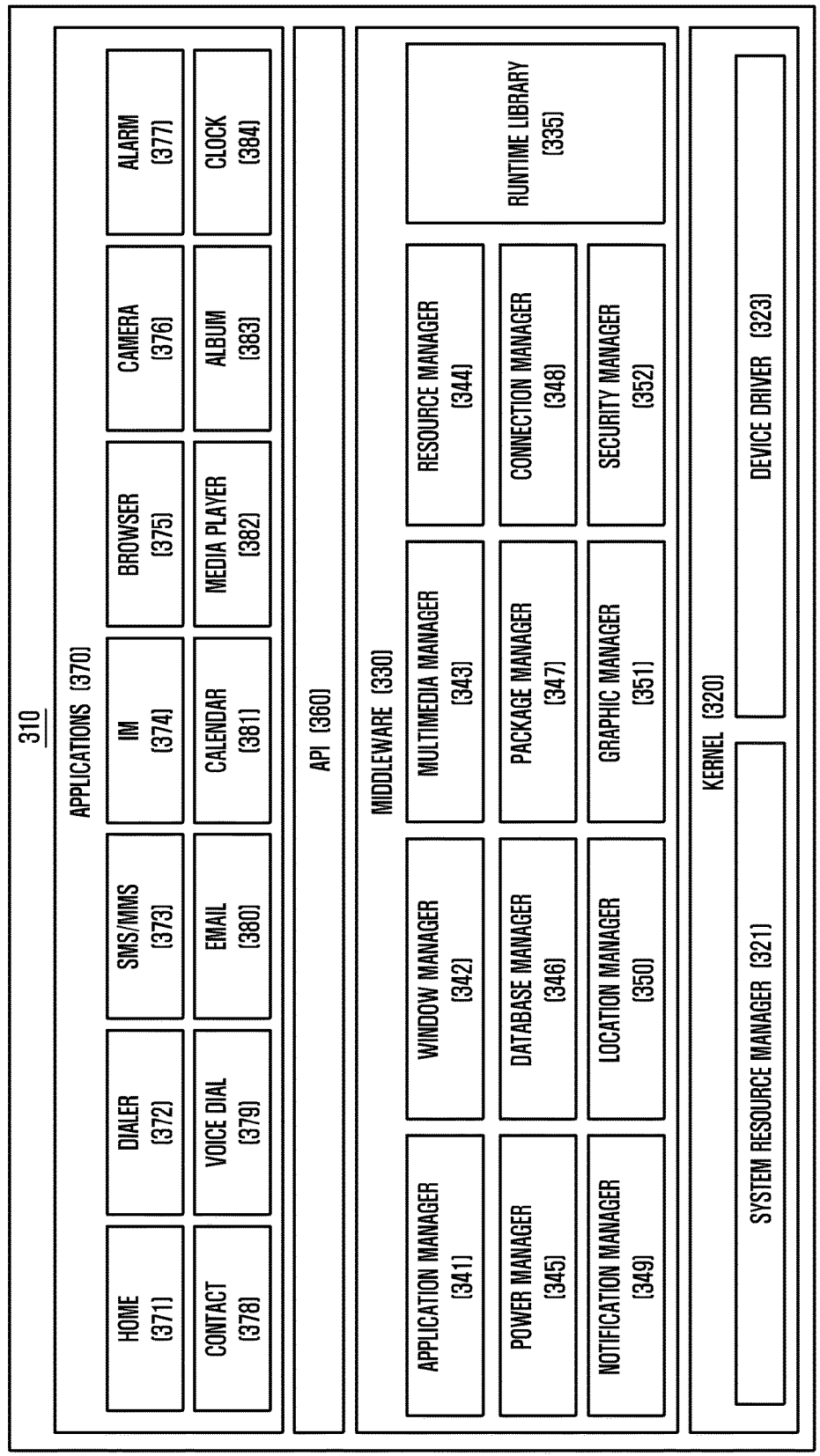
FIG. 3 is a block diagram illustrating a program module according to various embodiments of the present disclosure.

FIG. 3 is a block diagram illustrating a program module according to various embodiments of the present disclosure.

Referring to FIG. 3, a programming module 310 may be included, e.g. stored, in the electronic apparatus 101, e.g. the memory 130, as illustrated in FIG. 1. At least a part of the programming module 310 (e.g., program 140) may be realized by software, firmware, hardware, and/or combinations of two or more thereof. The programming module 310 may include an OS that is implemented in hardware, e.g., the hardware 200 to control resources related to an electronic device, e.g., the electronic device 101, and/or various applications. e.g., application 147, driven on the OS. For example, the OS may be Android, iOS, Windows, Symbian, Tizen, Bada, and the like.

Referring to FIG. 3, the programming module 310 may include a kernel 320 (e.g., kernel 141), middleware 330 (e.g., middleware 143), an API 360 (e.g., API 145), and the applications 370 (e.g., application 147). At least part of the program module 310 may be preloaded on the electronic device or downloaded from a server (e.g., an external electronic device 102, 104, server 106, etc.).

The kernel 320 may include a system resource manager 321 and/or a device driver 323. The system resource manager 321 may control, allocate, and/or collect system resources. The system resource manager 321 may include, for example, a process manager, a memory manager, and a file system manager. The device driver 323 may include, for example, a display driver, a camera driver, a BT driver, a shared memory driver, a USB driver, a keypad driver, a Wi-Fi driver, and an audio driver. Further, according to an embodiment, the device driver 323 may include an inter-process communication (IPC) driver (not illustrated).

The middleware 330 may include a plurality of modules implemented in advance for providing functions commonly used by the applications 370. Further, the middleware 330 may provide the functions through the API 360 such that the applications 370 may efficiently use restricted system resources within the electronic apparatus. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity (e.g., connection) manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager

347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus, e.g., the electronic device (or apparatus) 101, has a telephone call function, the middleware 330 may further include a telephony manager for managing a voice and/or video communication function of the electronic apparatus.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described in the various embodiments, further include other elements, and/or substitute the elements with elements having a different name and performing a similar function.

The API 360 is a set of API programming functions, and may be provided with a different configuration according to the OS. For example, in a case of Android or iOS, one API set may be provided for each of platforms, and in a case of Tizen, two or more API sets may be provided.

The applications 370 may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.), not shown.

According to an embodiment, the applications 370 are capable of including an application for supporting information exchange between an electronic device and an external device, which is hereafter called 'information exchange application'. The information exchange application is capable of including a notification relay application for relaying specific information to external devices or a device management application for managing external devices.

For example, the notification relay application is capable of including a function for relaying notification information, created in other applications of the electronic device to external devices. In addition, the notification relay application is capable of receiving notification information from external devices to provide the received information to the user.

The device management application is capable of managing (e.g., installing, removing or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device. According to an embodiment, the applications 370 are capable of including applications received from an external device. According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by an application processor (e.g., processor 210). At least part of the programing module 310 may include modules, programs, routines, sets of instructions or processes, etc., in order to perform one or more functions.

The term "module" used in the disclosure may refer to, for example, a unit including at least one combination of hardware (e.g., circuitry), software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the disclosure may include at least one of processing circuitry (e.g., a CPU), a dedicated processor, an application-specific IC (ASIC) chip, a field-programmable gate arrays (FPGA), and a programmable-logic device for performing operations which has been known and/or are to be developed.

According to various embodiments, at least some of the devices (e.g., modules or functions thereof) or the method (e.g., operations) according to the disclosure may be implemented by a command stored in a computer-readable storage medium in a programming module form. When the instructions are executed by at least one processor (e.g., the processor 120), the at least one processor may perform functions corresponding to the instructions. The computer-readable storage medium may be, for example, the memory 130. At least a part of the programming module may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. The aforementioned hardware device may be configured to operate as one or more software modules in order to perform the operation of the disclosure, and vice versa.

The module or programming module of the disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4:
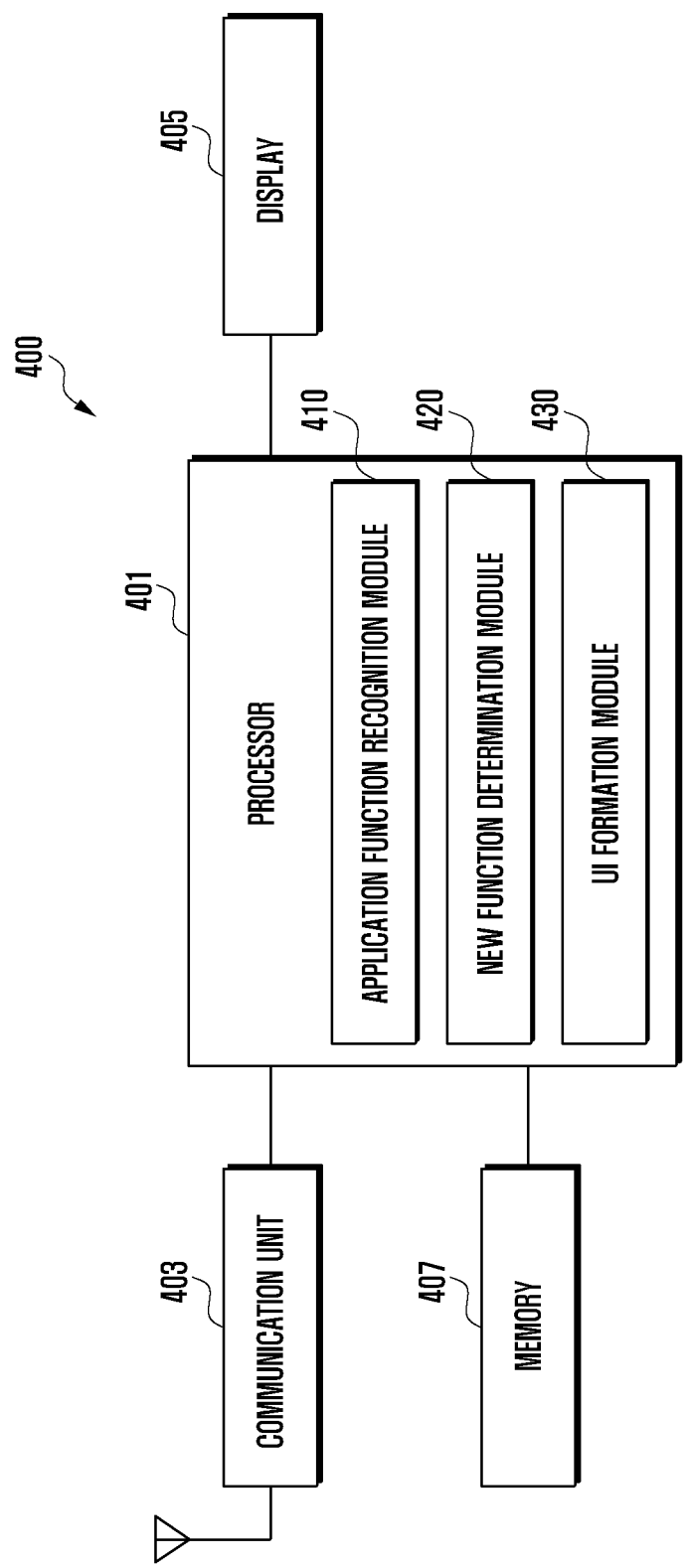
FIG. 4 is a block diagram illustrating an electronic device according to various embodiments of the present disclosure.

FIG. 4 is a block diagram illustrating an electronic device according to various embodiments of the present disclosure.

Referring to FIG. 4, in various embodiments, the electronic device 400 may include an application processor 401 (e.g., the processor 210 in FIG. 2), a communication unit 403, a display 405, and a memory 407.

The processor 401 may include an application function recognition module 410, a new function determination module 420, and a user interface (UI) formation module 430.

In various embodiments, the application function recognition module 410 may check (or analyze) a first set of activities (e.g., executables, functions or processes within the application) in order to determine a new function of an application, recognizing functions supported by the application. For example, the application function recognition module 410 may analyze the first set of activities, based on functions supported according to an update of the application. For example, added, deleted or improved functions of the application may be identified within a manifest file through an activity (e.g., process or function) definition file, and the application function recognition module 410 may analyze the first set of activities based on the generated manifest file. The application function recognition module 410 may deliver the first set of activities to the new function determination module 420.

In various embodiments, the new function determination module 420 may analyze a manifest file or an executable binary by reading a package for an application, before executing an update, from the memory 407 of the electronic device 400. Alternatively, the new function determination module 420 may analyze a manifest file or an executable binary by receiving a package for an application, before updating, from an external electronic device (e.g., the electronic device 104 or the server 106 in FIG. 1) through the communication unit 403. The package for the application may include an identification number of the electronic device 400, a user name, and/or any other unique information for identifying the electronic device 400. Also, the package for the application may further include at least one kind of information on the application, such as a version of the application, and a function supported by the application. The new function determination module 420 may check (or analyze) a second set of activities, based on the package for the application.

In various embodiments, the new function determination module 420 may determine (or detect) at least one new function for the application by comparing the first set of activities with the second set of activities.

In various embodiments, the UI formation module 430 may generate a UI to provide (or indicate) a user at least one new function determined by the new function determination module 420. For example, when any updated application is executed, the UI formation module 430 may form a UI which can include display of at least one new function (or identification thereof), as determined by the new function determination module 420 and distinguished from other functions.

In various embodiments, the UI formation module 430 may generate the UI for displaying at least one new function and at least one item for providing additional information (e.g., a user comment) corresponding to each of the at least one new function.

In various embodiments, if a predetermined condition is satisfied while an application is executed and a new function is performed, the UI formation module 430 may form a UI to provide a notification for obtaining additional information about the new function. For example, the UI formation module 430 may form the UI to provide the notification through a popup window or an indicator (e.g., an indicator 297 in FIG. 2) of the electronic device 400.

In various embodiments, the display 405 (e.g., the display module 260 in FIG. 2) may display the UI formed by the UI formation module 430. For example, the display 405 may display at least one new function to be distinguished from the other functions under the control of the processor 401. Also, under the control of the processor 401, the display 405 may display at least one new function and at least one item for providing additional information corresponding to each of the at least one new function.

In various embodiments, if a predetermined condition is satisfied while a new function is performed, the display 405 may display a notification for obtaining additional information about the new function under the control of the processor 401. For example, the display 405 may display the notification for obtaining such additional information through a popup window or an indicator under the control of the processor 401.

In various embodiments, the predetermined condition may include at least one of a date, a location, a version, and any information indicating a user's condition or state such as age, sex, height, and weight. For example, if the electronic device 400 is located at a specific location as the predetermined condition while performing a new function, the display 405 may display a notification for acquiring additional information about the new function under the control of the processor 401.

In various embodiments, if a predetermined condition is not satisfied while an application is executed and a new function is performed, the display 405 may not display a notification for obtaining additional information about the new function under the control of the processor 401.

In various embodiments, if an input for selecting one of the at least one item for providing additional information corresponding to each of the at least one new function is detected, the display 405 may display the additional information about the new function corresponding to the selected item under the control of the processor 401.

As described above, in various embodiments, the additional information may be a user's comment (also referred to as a user's review or feedback) and may be displayed in a suitable UI. Through this UI, a user may check other users' comments about the new function or write his or her comment about the new function. For example, by selecting one of the at least one item indicating the additional information, a user may check other users' comments, ratings, and the like regarding the new function corresponding to the selected item. Also, a user may select one of the at least one item indicating the additional information and then write his or her comment about the new function corresponding to the selected item.

In various embodiments, the first set of activities is use for determining a new function of an updated application, and may include at least one function which is executable in the updated application. For example, added, deleted or improved functions as compared with functions before the application is updated may be created as a manifest file through an activity definition. The electronic device may identify the first set of activities, based on the created manifest file.

In various embodiments, the second set of activities may include at least one function which is executable in the application prior to being updated.

In various embodiments, the electronic device may compare the first set of activities and the second set of activities and thereby determine at least one new function of the application.

In various embodiments, the additional information about the new function may include a user's comment on the new function. Specifically, the additional information may include the first additional information including other user's comment on the new function and the second additional information including a comment of the user using the electronic device.

Figure 5:
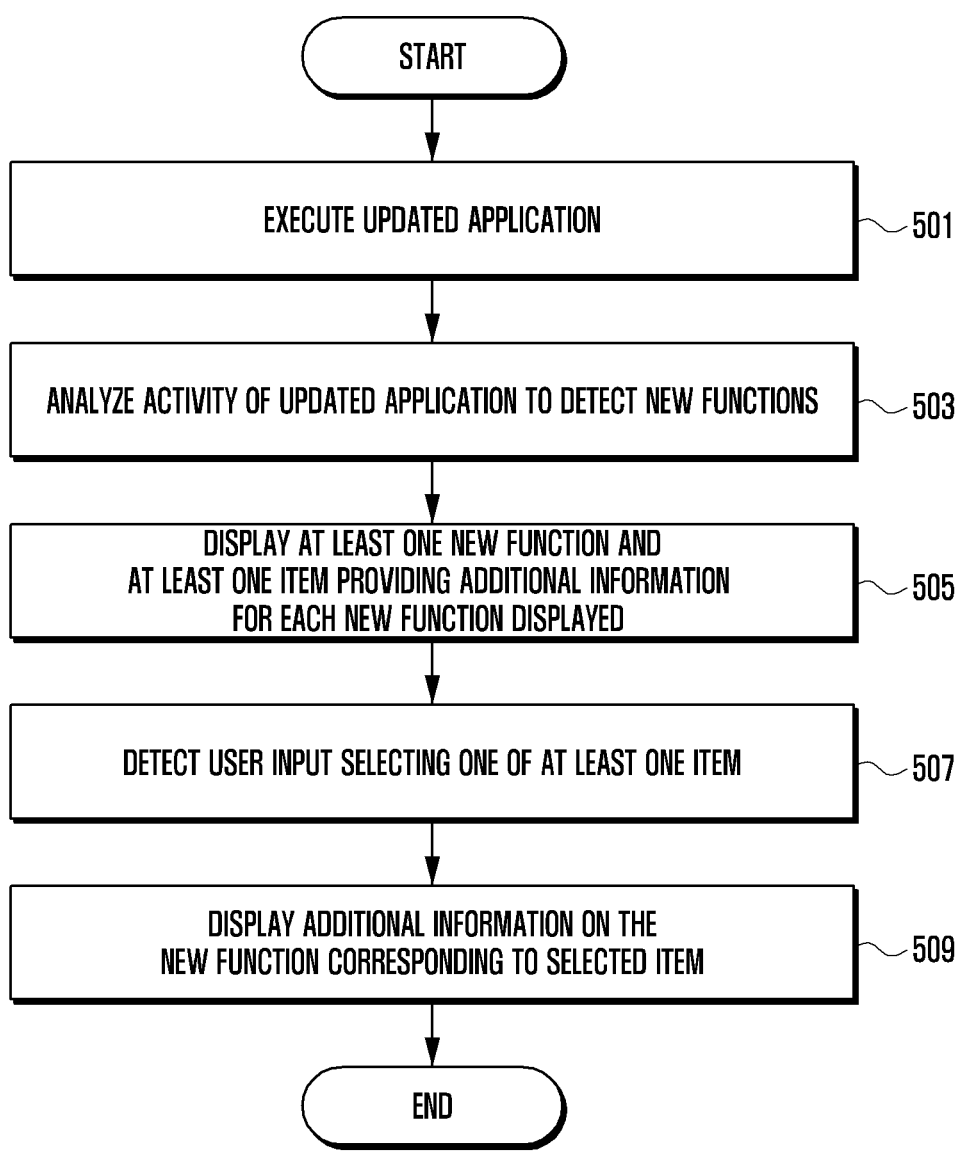
FIG. 5 is a flow diagram illustrating a method for providing additional information about an application according to various embodiments of the present disclosure.

FIG. 5 is a flow diagram illustrating a method for providing additional information about an application according to various embodiments of the present disclosure.

Referring to FIG. 5, at operation 501, the processor 401 may execute an updated application. For example, the processor 401 may receive update information for an application from an external electronic device, and determine whether an input requesting update of the application (which may be transmitted to the external electronic device) is detected. For example, this update request input may be an input selecting the update information when the update information for the application is received from the external electronic device. Alternatively, the update of the application may be set to be automatically performed, as sometimes preconfigured by, for example, a user configured setting.

In various embodiments, when the input requesting the application update is detected, the processor 401 may transmit a request to update the application to the external electronic device. Then, the processor 401 may download an update file for the application from the external electronic device, install the update file, and then execute the updated application.

At operation 503, the processor 401 may analyze (e.g., check) the first set of activities of the updated application to order to detect new functions of the updated application. In various embodiments, the first set of activities is leveraged to detect a new function (or new functions) of the updated application, which may thus include at least one function which is executable in the updated application. For example, added, deleted or improved functions are identified, as compared with older versions or presence of various functions known before the application was updated, and may be created as a manifest file through an activity definition. The processor 401 may analyze the first set of activities, based on the created manifest file.

At operation 505, based on the first set of activities, the processor 401 may display at least one or more identified new functions of the application, and one or more items (e.g., at least one item) providing additional information corresponding to each new function of the one or more new functions. Additional detail is provided with reference to FIGS. 6 and 8.

As discussed above, various embodiments of this disclosure display at least one item for providing additional information, e.g., a user's comment, corresponding to each of the at least one new function such that a user who wants to write his or her comment on the new function can simply select a desired item for the new function and then write the comment. Therefore, contrary to conventional technique, this disclosure can prevent the user from suffering some inconvenience to first describe the function and then write the comment. Further, this disclosure provides an effect of accurately knowing which comment is associated with which new function.

At operation 507, the processor 401 may detect a user input selecting one of the one or more items. Then, at operation 509, the processor 401 may display the associated additional information for the new function corresponding to the selected item.

In various embodiments, the additional information about the new function may include the first additional information and the second additional information. The first additional information may include other user's comment on the new function. For example, the first additional information may be received from any other device through the communication unit 403 or obtained from the memory 407 (e.g., retrieved from database of application). The second additional information may include a user's comment written by a user of the electronic device 400.

In various embodiments, the processor 401 may display the additional information about the new function and also display a region for obtaining the second additional information. In this region, the user may enter the second additional information, e.g., comments, about the new function. The processor 401 may store the second additional information in the memory 407 and/or transmit the second additional information to any external electronic device through the communication unit 403. In such cases, the processor 401 may also store and/or transmit identification information of the electronic device 400, the new function, and the like together with the second additional information about the new function. This will be described later in detail with reference to FIG. 9.

Figure 6:
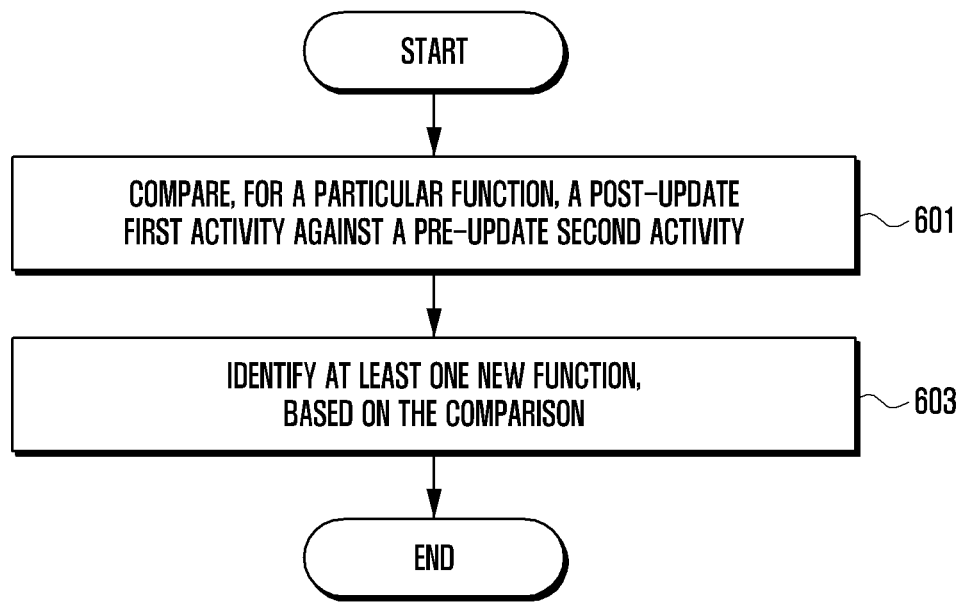
FIG. 6 is a flow diagram illustrating a method for determining a new function of an application according to various embodiments of the present disclosure.

FIG. 6 is a flow diagram illustrating a method for determining a new function of an application according to various embodiments of the present disclosure.

Referring to FIG. 6, after analyzing the first set of activities to identify at least one function of the updated application at operation 503 in FIG. 5, the processor 401 may compare, at operation 601, the first set of activities (e.g., a post-update list of activities) of a particular function with a corresponding second set of activities of the same function operable prior to the update.

In various embodiments, the processor 401 may read (e.g., parse) a package of an application. This application package may include at least one function executable in the application prior to installation of the update, and history information of such functions. For example, in various embodiments, the processor 401 may execute a certain application installed in the electronic device 400 and store or transmit data associated with functions performed according to the execution of the application, in the memory 407 or to an external electronic device through the communication unit 403. For example, the processor 401 may execute functions of the application upon login to the application using identification information of the electronic device 400 (e.g., login information, such as a user's name, nickname, password or address, of the application installed in the electronic device 400). The processor 401 may automatically store or transmit the history information, associated with the performance of functions of the application, in the memory 407 or to an external electronic device through the communication unit 403. Based on the read package of the application, the processor 401 may check or analyze the second set of activities and compare the first set of activities with the second set of activities.

At operation 603, the processor 401 may determine (e.g., detect) at least one new function of the application, based on the result of comparison. Namely, the processor 401 may detect a newly added, deleted or improved function from the first set of activities based on the comparison executed against the second set of activities.

Figure 7:
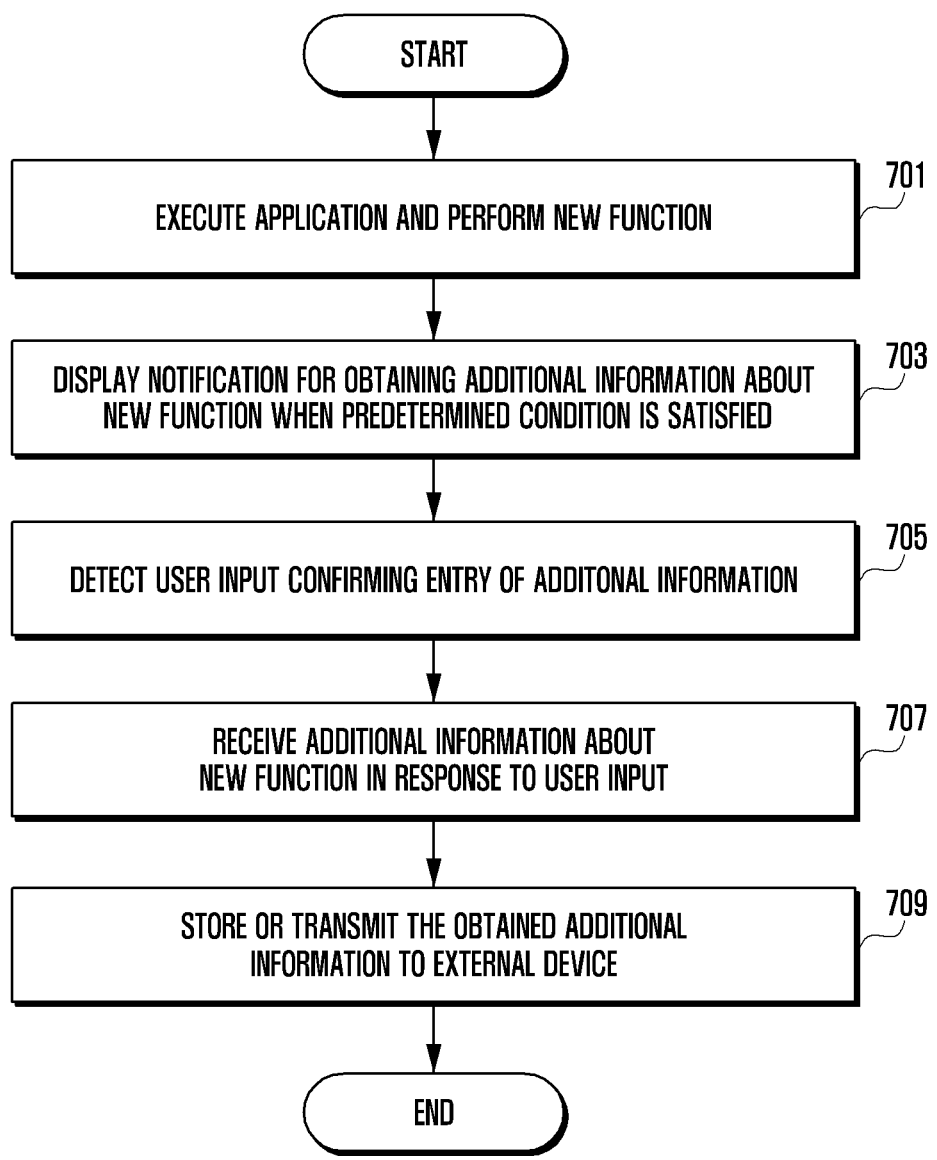
FIG. 7 is a flow diagram illustrating a method for obtaining additional information about an application according to various embodiments of the present disclosure.

FIG. 7 is a flow diagram illustrating a method for obtaining additional information about an application according to various embodiments of the present disclosure.

Referring to FIG. 7, at operation 701, the processor 401 may execute an application and perform a new function of the executed application.

At operation 703, the processor 401 may generate a notification for display indicating a query to obtain additional information (e.g., feedback) about the new function when a predetermined condition is satisfied (e.g., after expiry of a time period after updating of the application), while the new function is being executed. The additional information may be the second additional information including a user's comment (e.g., feedback) written by a user of the electronic device 400. The processor 401 may cause output of the notification via display of a popup window or another suitable visual indicator.

In various embodiments, the processor 401 may collect user information and contextual information. The user information may include information about a user's log, age, sex, height, and weight, and information about an update date of the application. The contextual information may include information about a current date and a current weather, and location information of the electronic device 400. The predetermined condition may be used in tandem with obtaining a user's comment on a new function, and may include at least one of a current date, a current location, an application version, an application update date, a user's age, sex, height, and weight.

For example, if the age of the user of the electronic device 400 corresponds to the predetermined age for obtaining a user's comment on a new function, the processor 401 may provide a notification for obtaining the second additional information. Also, if the application update date corresponds to the predetermined date (e.g., after 2 days from the application update date) for collecting a user's comment on a new function, the processor 401 may provide a notification for obtaining the second additional information.

At operation 705, the processor 401 may detect a user input confirming an intention to enter additional information (e.g., the second additional information) about a new function. Then, at operation 707, the processor 401 may receive the additional information (e.g., the second additional information or the user feedback) regarding the new function. For example, a popup window for obtaining a user's comment may be displayed while the new function of the application continues to be executed, and the user may enter his or her feedback (e.g., comments) for the new function via the popup window.

At operation 709, the processor 401 may store the entered additional information (e.g., user feedback) regarding the new function in the memory 407 and/or transmit it to an external electronic device through the communication unit 403.

In this case, the processor 401 may also store or transmit identification information of the electronic device 400, the new function, and the like together with the second additional information about the new function. For example, in various embodiments, the processor 401 may store the identification information of the electronic device 400. The identification information of the electronic device 400 may include login information (e.g., a user's name, nickname, password, or address) of the application installed in the electronic device 400.

In various embodiments, the processor 401 may execute a selected application (e.g., a health care application) installed in the electronic device 400 and perform a specific function (e.g., a running function) of the application upon a user's login to the application through an input of identification information of the electronic device 400 (e.g., a user's name, ID, password, etc.). If a predetermined condition (e.g., after two days from an application update date) is satisfied while performing the specific function of the application, the processor 401 may output a notification for obtaining additional information about the specific function. If a user input for entering additional information about the specific function is detected, the processor 401 may store or transmit, in the memory 407 or to an external electronic device, the identification information of the electronic device 400 (e.g., a user's ID or an identification number of the electronic device 400) and the new function together with the additional information about the new function. This will be described later in detail with reference to FIG. 10.

Figure 8:
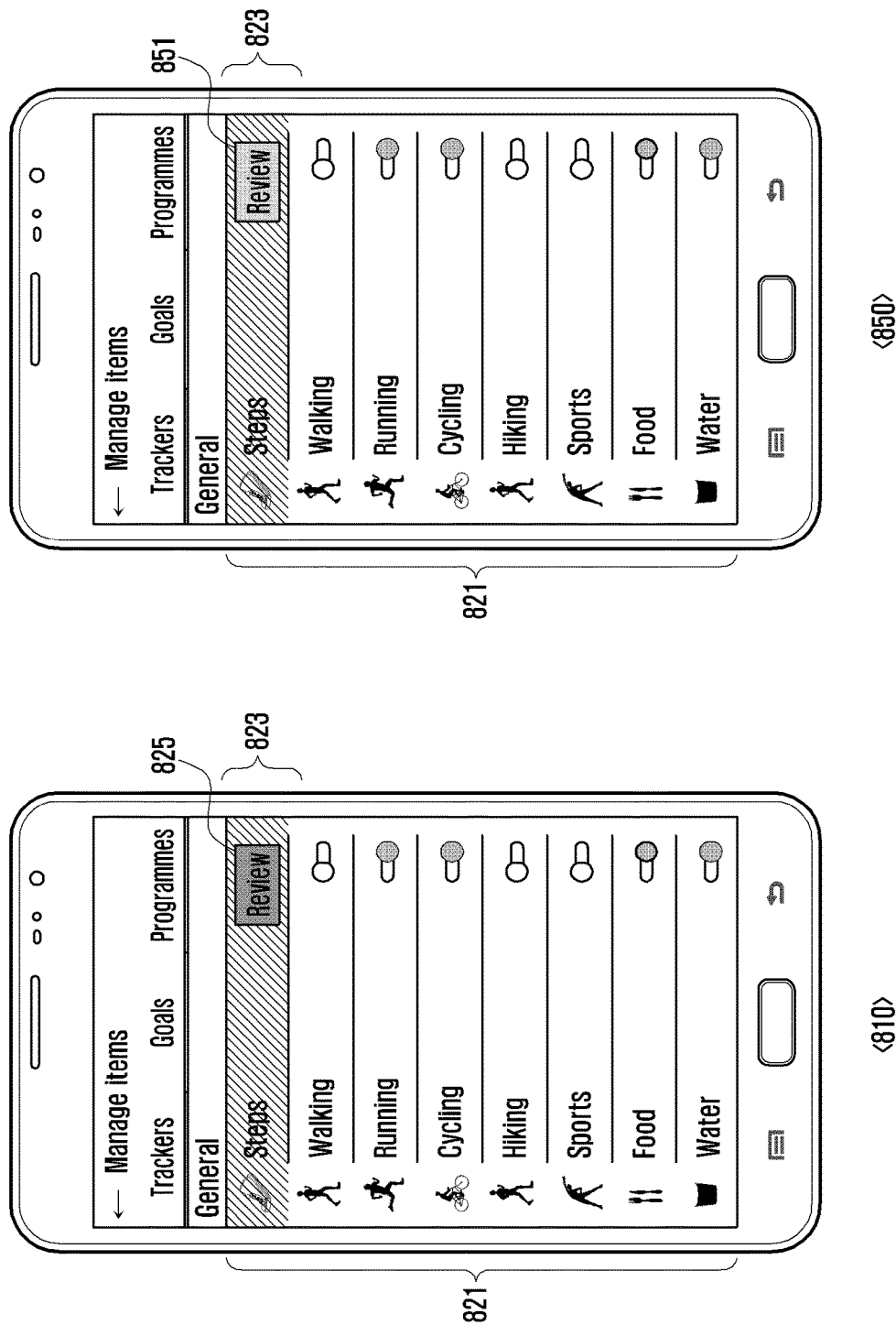
FIG. 8 is a screenshot illustrating a new function identified on an application execution screen according to various embodiments of the present disclosure.

FIG. 8 is a screenshot illustrating a new function identified on an application execution screen according to various embodiments of the present disclosure.

Referring to FIG. 8, the processor 401 may display an application execution screen as denoted by reference numerals 810 and 850. Herein, the application is assumed to be a health care application. Namely, the application execution screen may be a screen displayed after the update of the health care application. At least one function being executable through the health care application may be defined as an activity. Based on the defined activity, the first set of activities provided within the health care application may be checked or identified. For example, as shown, the first set of activities 821 may include steps, walking, running, cycling, hiking, sports, food, and water.

The processor 401 may check the second set of activities which defines functions (or at least one function) executable in the application prior to applying an update. Then the processor 401 may compare the first set of activities with the second set of activities.

For example, as shown, the second set of activities may include walking, running, cycling, hiking, sports, food, and water.

The processor 401 may compare the first set of activities (e.g., steps, walking, running, cycling, hiking, sports, food, and water) with the second set of activities (e.g., walking, running, cycling, hiking, sports, food, and water).

Based on the comparison, the processor 401 may detect that a particular function "steps" 823 is a new function within the updated application. The processor 401 may display the new function 823 visually distinguished from the other functions which include "walking, running, cycling, hiking, sports, food, and water." For example, the new function may be visually highlighted or shaded. In addition to the new function 823, the processor 401 may further display an item (or icon) 825 that is selectable to provide additional information (e.g., for receiving a user's comment) regarding the new function 823. This item 825 may be displayed in tandem with the corresponding new function 823 to indicate its relevance to the new function 823. For example, the item 825 may be displayed near the new function 823 or within the same visual icon or boundary, as depicted in FIG. 8.

In various embodiments, the processor 401 may display the item 825 differently according to a posting time of a user's comment, the number of user's comments, and a rating of the new function. For example, if the posting time of the user's comment is one hour ago, the processor 401 may display the item 825 with a shading ratio of 80%. In another example, if the posting time of the user's comment is one day before, the processor 401 may display the same item, denoted as other reference numeral 851, with a shading ratio of 20%. In other words, the item regarding the new function may be displayed with different shading ratios which are varied depending on the posting time of the user's comment. Similarly, the processor 401 may display the item by differently setting the color, emission rate, or the like of the item according to the number of user's comments, a rating of the new function, or any other equivalent.

Figure 9:
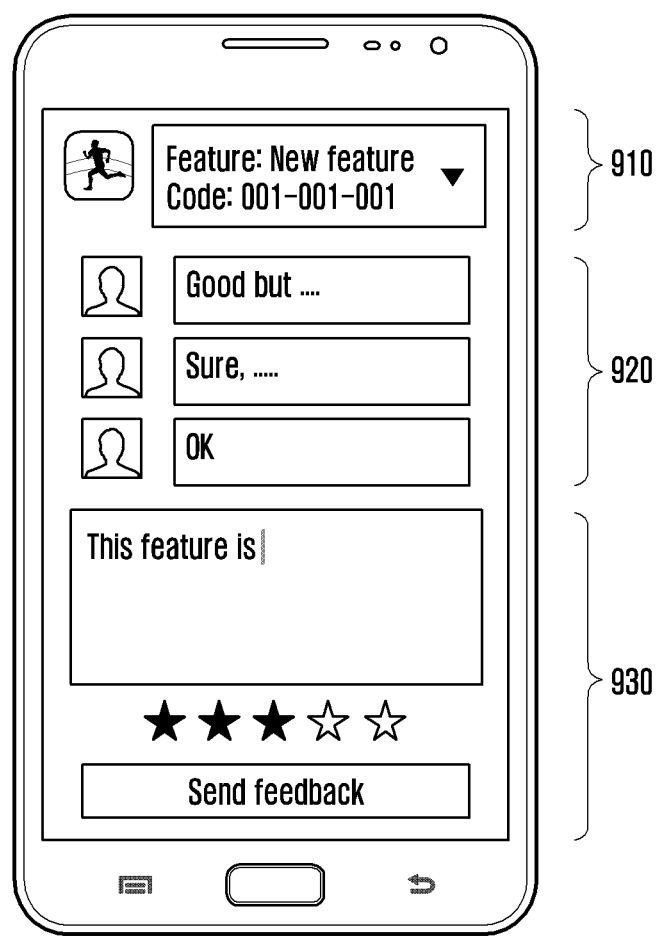
FIG. 9 is a screenshot illustrating a method for providing and obtaining additional information about an application according to various embodiments of the present disclosure.

FIG. 9 is a screenshot illustrating a method for providing input of additional information (e.g., feedback) for an application according to various embodiments of the present disclosure.

Referring to FIG. 9, a screen is depicted displaying additional information on a new function. This screen may be referred to as a "user comment screen" or "user comment page."

When an input is detected selecting the item (e.g., item or icon 825 or 851 in FIG. 8), the processor 401 may display the user comment screen as shown in FIG. 9. The user comment screen may contain a first region 910 displaying information on a new function, a second region 920 displaying the first additional information, such as other users comments that have previously been collected on the new function, and a third region 930 for entering the second additional information, such as a user's comment or review of the new function.

The first region 910 may display a name of the new function (e.g., 'New feature' as shown) and a code corresponding to the same (e.g., '001-001-001' as shown).

The second region 920 for the first additional information may display other user comments collected regarding the new function. The first additional information (e.g., the first comment) to be displayed may be retrieved from the memory 407 (e.g., a local database of application) or received from an external electronic device.

The third region 930 for the second additional information may display a suitable UI allowing the user of the electronic device 400 to write his or her comment on the new function. This UI may have a comment input box, a function rating part, and a feedback button. The user may enter his or her comment on the new function in the comment input box, evaluate the rating of the new function by selecting one of the prespecified fields of the function rating part, and transmit the second additional information including the entered comment and/or evaluated rating by selecting the "send feedback" button. This feedback of the second additional information may further include the identification information of the electronic device 400 and information about the new function (such as identifying information thereof).

Figure 10:
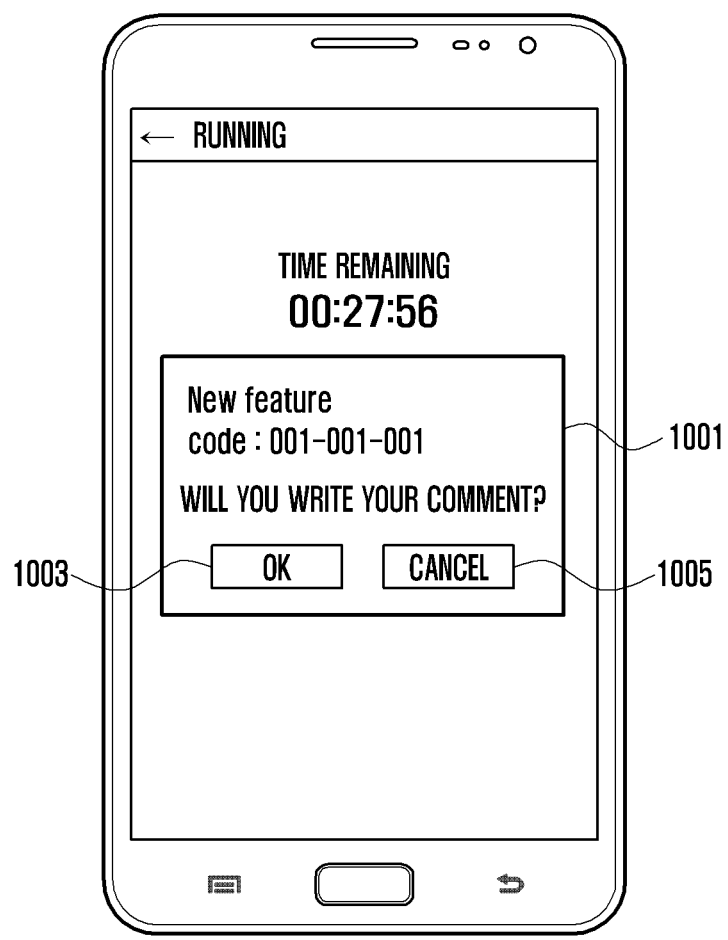
FIG. 10 is a screenshot illustrating a method for obtaining additional information about an application according to various embodiments of the present disclosure.

FIG. 10 is a screenshot illustrating a method for obtaining additional information about an application according to various embodiments of the present disclosure.

Referring to FIG. 10, shown is a screen for obtaining additional information about a new function while the new function is presently being executed.

If a predetermined condition is satisfied while the new function is performed, the processor 401 may display a popup window 1001 to obtain a user's comment on the new function. For example, the predetermined condition may be a time-condition, such as querying a user for feedback two days after the application has been updated. If an input selecting an "OK" button 1003 is detected from the popup window 1001, the processor 401 may display the user comment screen as shown in FIG. 9. As discussed above, within the user comment screen, the user may check other users' comments on the new function through the user comment screen and also write his or her comment on the new function. Returning to FIG. 10, if an input selecting a "cancel" button 1005 is detected in the popup window 1001, the processor 401 may remove display of the popup window 1001 and continue executing the new function.

This process for obtaining the user feedback (e.g., a user's comment) on the new function is not limited to utilization of the popup window 1001, as shown in FIG. 10. Alternatively, the processor 401 may display a notification for obtaining the user's comment through an indicator.

Meanwhile, example embodiments disclosed herein are merely presented to easily describe technical contents of this disclosure and help the understanding of the disclosure and are not intended to limit the scope of the disclosure. Therefore, all changes or modifications derived from the subject matter the present disclosure as well as the embodiments described herein should be interpreted to belong to the scope of the disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C.

112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A method for an application in an electronic device, comprising:
  analyzing, by a processor of the electronic device, activity of the application to identify at least one new function by an update to the application;
  displaying, on a display of the electronic device, at least one item selectable to provide additional information corresponding to the identified at least one new function;
  displaying, on the display, additional information on a specific new function corresponding to a selected item in response to detection of a user input for selecting the item of the at least one item;
  receiving an input of second additional information as feedback for the specific new function; and
  executing at least one of storing the second additional information in a memory and transmitting information identifying the electronic device, information identifying the specific new function, and the second additional information to an external electronic device through a communication unit.

2. The method of claim 1, wherein the additional information is received from the external electronic device through the communication unit or retrieved from the memory.

3. The method of claim 2, wherein the additional information includes at least one comment generated by another user corresponding to the specific new function.

4. The method of claim 1, further comprising:
  while the specific new function is being executed, in response to detecting that a predetermined condition has been satisfied, controlling the display to display a notification querying for input of the second additional information,
  receiving the second additional information in response to detecting a user input for input of the second additional information, and
  executing at least one of storing the second additional information in the memory, and transmitting the second additional information to the external electronic device through the communication unit.

5. The method of claim 4, wherein the notification comprises at least one of a popup window and an indicator of the electronic device.

6. The method of claim 1, wherein the at least one function is identified by comparing a first set of activities of the application after application of the update with a second set of activities of the application before application of the update, and to detect the at least one new function of the application based on a result of the comparison.

7. An electronic device comprising:
  a communication unit;
  a display;
  a memory; and
  a processor electrically coupled to the memory, the communication unit, and the display and configured to:
    identify at least one new function of an application by an update to the application,
    control the display to display at least one item selectable to provide additional information corresponding to the identified at least one new function,
    in response to detection of a user input for selecting an item of the at least one item, control the display to display additional information on a specific new function corresponding to the selected item,
    receive an input of second additional information as feedback for the specific new function, and
    execute at least one of storing the second additional information in the memory and transmitting information identifying the electronic device, information identifying the specific new function, and the second additional information to an external electronic device through the communication unit.

8. The electronic device of claim 7, wherein the additional information is received from the external electronic device through the communication unit or retrieved from the memory.

9. The electronic device of claim 8, wherein the additional information includes at least one comment generated by another user corresponding to the specific new function.

10. The electronic device of claim 1, wherein the processor is further configured to:
  while the specific new function is being executed, in response to detecting that a predetermined condition has been satisfied, control the display to display a notification querying for input of the second additional information,
  receive the second additional information in response to detecting a user input to input the second additional information, and
  execute at least one of storing the second additional information in the memory and transmitting the second additional information to the external electronic device through the communication unit.

11. The electronic device of claim 10, wherein the notification comprises at least one of a popup window and an indicator of the electronic device.

12. The electronic device of claim 1, wherein the at least one function is identified by comparing a first set of activities of the application after application of the update with a second set of activities of the application before application of the update, and to detect the at least one new function of the application based on a result of the comparison.

* * * * *